July 2, 1968  J. TSCHUDY, JR  3,390,649
PRECISION ENVIRONMENT PLANTER AND MULCH APPLICATOR
Filed March 9, 1966  2 Sheets-Sheet 1
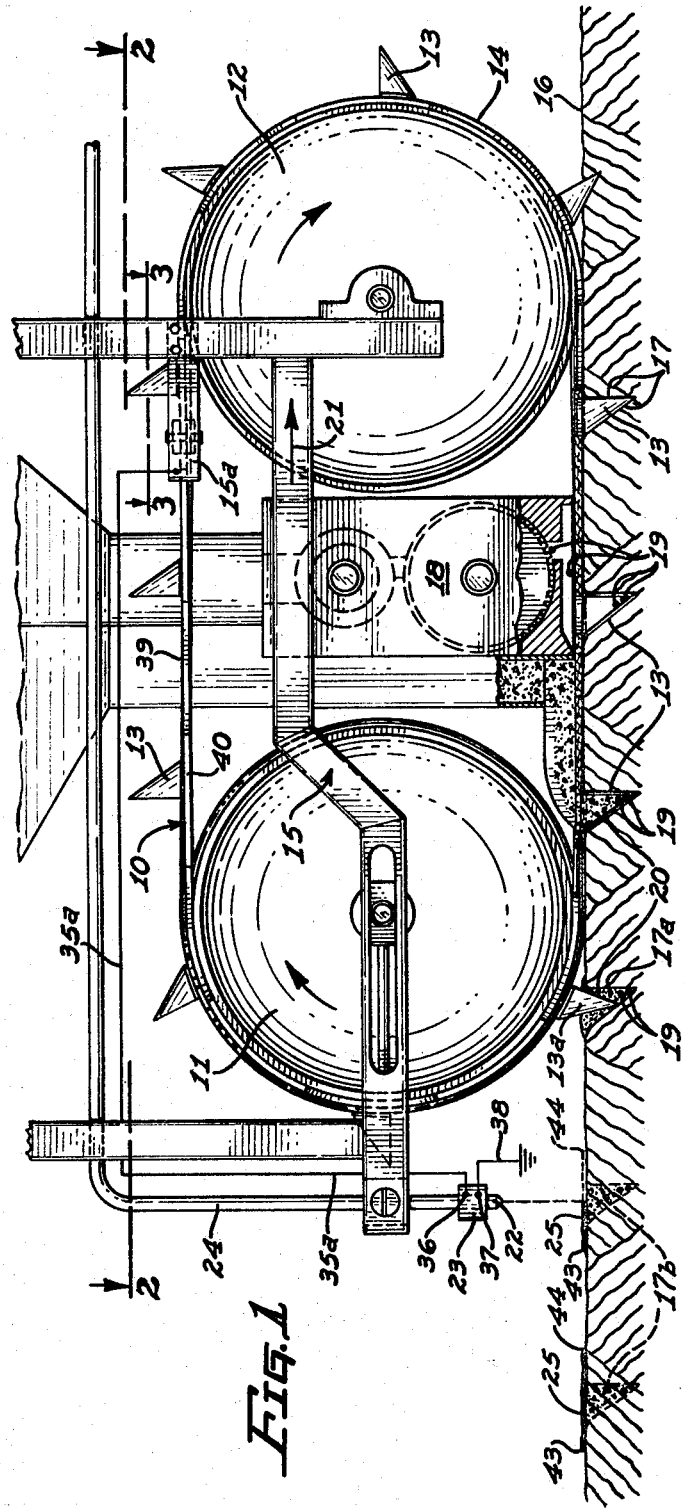
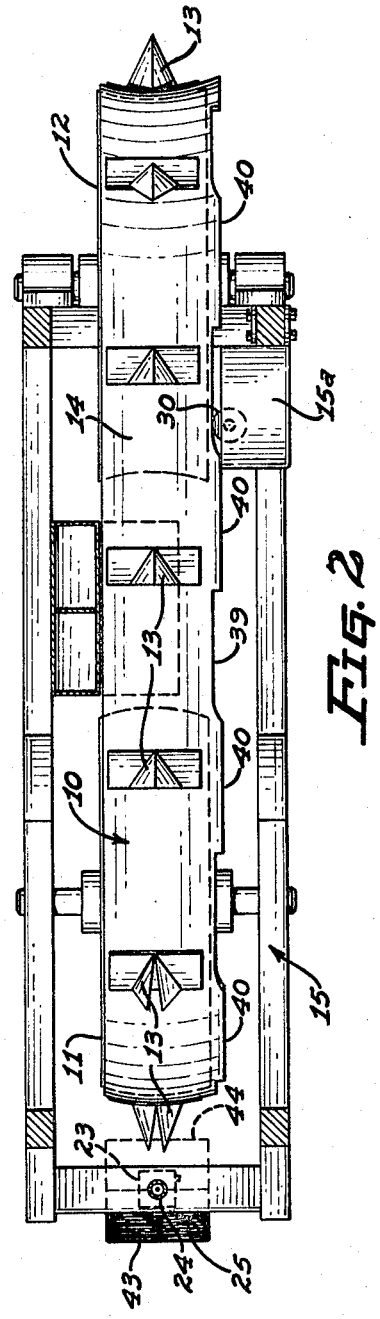
INVENTOR.
JAY TSCHUDY.
BY
ATTORNEY.

July 2, 1968   J. TSCHUDY, JR   3,390,649
PRECISION ENVIRONMENT PLANTER AND MULCH APPLICATOR
Filed March 9, 1966   2 Sheets-Sheet 2

INVENTOR.
JAY TSCHUDY.
BY
William S. Brown
ATTORNEY.

United States Patent Office 3,390,649
Patented July 2, 1968

3,390,649
PRECISION ENVIRONMENT PLANTER AND MULCH APPLICATOR
Jay Tschudy, Jr., Shawnee Mission, Kans., assignor to Precision Agricultural Machinery Company, Phoenix, Ariz., a corporation of Arizona
Filed Mar. 9, 1966, Ser. No. 532,961
2 Claims. (Cl. 111—91)

ABSTRACT OF THE DISCLOSURE

A method and apparatus for applying a spot mulch of liquid material to a limited area immediately above and contiguous to precision planted seeds and fertilizer in a plant row, particularly in a synchronized manner with a precision seed planting apparatus.

---

This invention pertains to improvements in agricultural machinery and a method of applying mulch to plant rows and is further directed to a precision seed and fertilizer planter with a timed liquid mulch applicator.

Presently there has been considerable interest in the use of asphalt and similar materials in liquid form as a mulch in agricultural practices. It is a present practice to plant the crop row and then spray an emulsion of asphalt along the crop row, the width of the sprayed band along the row being of varying widths, but customarily about 6 inches wide.

There has been some misunderstanding about the effect of the asphalt mulch. At one time it was thought that the asphalt mulch reduced evaporation under the mulch area throughout the growing season. This almost certainly is not the case. It is now believed that the total value of the asphalt mulch is derived only over a very short period after its initial application. Specifically, for a short period of perhaps two weeks, it does retard evaporation and possibly more importantly raises the temperature of the soil under the mulch. Both of these effects would promote early germination of the seeds. Once the plants have emerged, however, the mulch has little if any further effect. Under present practice the use of the asphalt mulch will be marginal at best. If an asphalt mulch program is to be a real commercial sucess, it will be necessary to reduce costs.

With the above facts in mind, applicant has conceived that essentially all of the benefits of an asphalt mulch can be achieved at substantially reduced costs, if instead of spraying a wide band along the entire crop row, one sprays only a small area immediately adjacent to and around the planted seed. To this end applicant plants the field with the plant seeds distributed on equal spacing centers using a precision planter such as shown in Patent 3,154,031 issued Oct. 27, 1964 and copending application Ser. No. 518,122. Applicant attaches a spray head to the precision planter to spray the emulsion only in the areas immediately surrounding the seeds. Preferably, the sprayed area would be a 2″ x 2″ square with the seed being in the middle of the sprayed area. Thus, it can be seen that there would be a substantial savings in the cost of the asphalt emulsion.

One of the objects of this invention is to provide a method of spot mulching with a liquid mulch the small area immediately around the planted seed in a plant row.

Still another object is to provide a method of precision planting seed and fertilizer along a plant row while appling a liquid mulch in a restricted area over the top of the planted seeds in an accurately timed operation with the precision seed and fertilizer planting steps.

It is a further object of this invention to provide a method of progressively spraying a liquid mulch on a small area immediately adjacent to and surrounding the planted seed in a synchronized manner with the precision planting of the seeds along a plant row.

Another object is to provide a method of and apparatus for planting the field with plant seeds distributed on equal spacing centers by means of a precision planter and then by means of a liquid much spray associated with the planter to spray the liquid much automatically only in the areas immediately surrounding the planted seeds.

Further features and advantages of this invention will appear from a detailed description of the drawings in which:

FIG. 1 is a fragmentary side elevation of a precision seed planter and synchronized spot mulching machine incorporating the features of this invention.

FIG. 2 is an enlarged plan view of the planter belt and mulch spraying nozzle indicated by the line 2—2 of FIG. 1.

Figure 3:
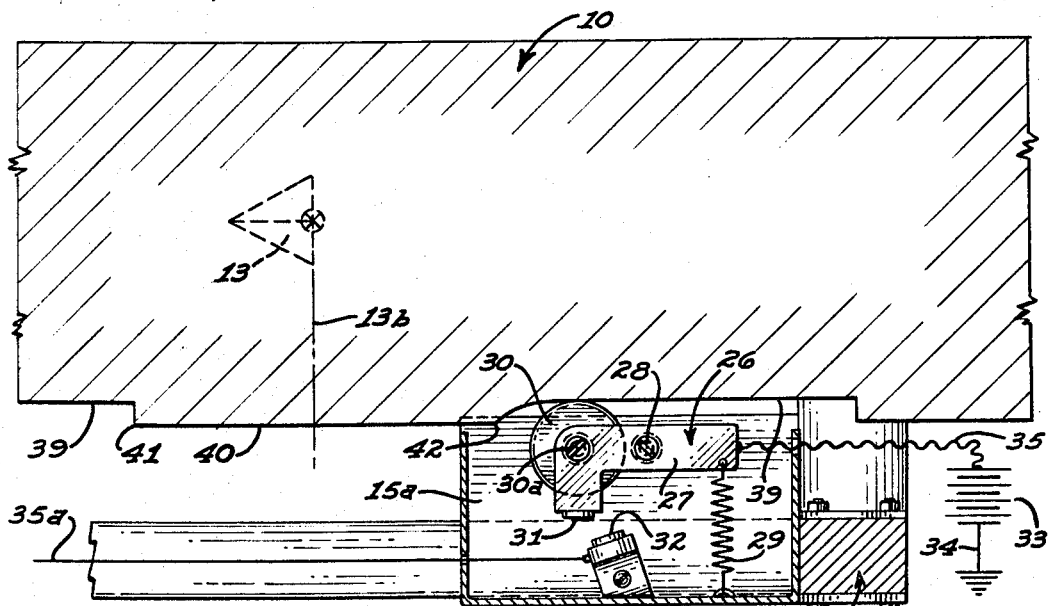
FIG. 3 is an enlarged fragmentary sectional view of the mulch spray timer control indicated by the line 3—3 of FIG. 1.
Figure 4:
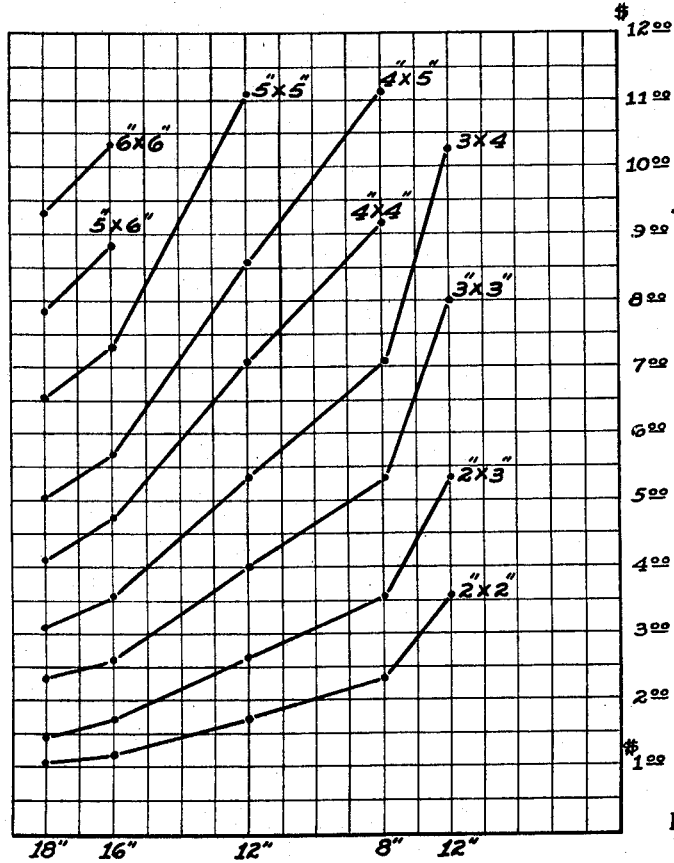
FIG. 4 is a graph showing the cost of a liquid mulch on plantings under varying conditions.

As an example of one embodiment of this invention there is shown a precision seed planter and synchronized spot mulching apparatus comprising a precision planter such as described in the above mentioned Patent 3,154,-031 in which there is provided an endless flat belt 10 operating over a convex pulley 11 and a concave pulley 12 and having a series of planting fingers or dibbles 13 extending outwardly from the outer face 14 of the belt 10. The pulleys 11 and 12 are suitably journaled on a frame 15 which is suitably connected to the usual towing tractor, not shown. As the precision planter described is towed along a suitably leveled plant row ground surface 16 the planting dibbles form longitudinally spaced planting cavities 17 in which the planting dibbles 13 and seed feed mechanism 18 deposits the required seed 19, and fertilizer and mulch granules 20.

Referring particularly to FIG. 1, when the dibble 13a withdraws from a planting cavity 17a the soil around the cavity is caused to fall into it to cover the seeds 19 and fertilizer 20. As the frame 15 of the planter moves along in the direction of the arrow 21 the planted cavities become progressively exposed at the rear of the endless belt as at 17b. At the rear of the frame 15 is mounted a liquid mulch dispensing nozzle 22 having a suitable solenoid control valve 23 controlling the flow from the supply pipe 24 for the nozzle 22. The supply pipe 24 may be connected to a suitable pressurized source of liquid mulch, one preferred form of which is commercially available liquid asphalt emulsion.

The nozzle 22 is controlled by the solenoid valve 23 in such a manner that a small spot or patch of asphalt emulsion 25 is spread over and immediately surrounding the planted seeds in the cavities 17b in an interrupted spaced relationship along the plant row so that no emulsion is presented on the plant row between the planted seeds. To effect the synchronized control of the intermittent application of the asphalt emulsion in exact timed relation with the spaced planting of the seeds, there is provided a suitable normally open control limit switch 26, FIG. 3, having an operating arm 27 pivotally mounted on a suitable screw 28 carried in a box 15a, mounted on the frame 15 and including a tension spring 29 interconnected between the box 15a and the operating arm 27 to yieldingly bias the arm in a clockwise direction. An actuating roller 30 is pivotally mounted on a suitable screw 30a on the other end of the arm 27. An electrical contact 31 on the arm 27 is arranged to engage a fixed contact 32 mounted in the box 15a.

A suitable source of electrical power such as the battery 33 has one terminal grounded by the lead 34 and its other terminal suitably connected by a flexible lead 35 to the arm 27 and contact 31. The fixed contact 32 is connected by a lead 35*a* to one terminal 36 of solenoid valve 23 while the other terminal 37 is connected by a lead 38 to the ground. Along one edge 39 of the endless belt 10 are fixed a series of raised dwell timing cam surfaces 40, each laterally aligned with the centerline 13*b* of each dibble 13 and extending longitudinally of the belt a limited distance 41–42 determined by the desired longitudinal extent 43–44 desired for the emulsion spot 25 to be sprayed on the plant row over the planted seeds 19.

Thus, as the frame moves forward in the direction of arrow 21 the roller 30 of the limit switch 26 will be actuated to energize the solenoid valve 23 to spray the liquid mulch over the planted seeds and fertilizer, and to deenergize the solenoid valve to stop spray flow between the planted seeds and fertilizer to provide an interrupted strip of asphalt mulch along the crest of the plant row. The width of the sprayed spots is determined by the adjustment of the laternal extent of the fan-shaped spray for the nozzle 22, the sized area to be determined by the nature of the crop, weather conditions, and methods of irrigation as well as soil conditions.

FIG. 4 is a graph illustrating the cost of employing the method of this invention on row crops under varying conditions. The cost estimates are based upon an assumed cost of 35¢ per gallon for asphalt emulsion with the further assumption that a gallon of the emulsion will cover 83 sq. ft. of soil. The graph is made on the further assumption that the plant rows are spaced 38″ apart with the spacing between seeds along the plant row varying from 6″ to 18″. A series of curves are shown for cost where the actual area to be sprayed is, respectively, 2″ x 2″, 2″ x 3″, 3″ x 3″, 3″ x 4″, 4″ x 4″, 4″ x 5″, 5″ x 5″, 5″ x 6″, and 6″ x 6″.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. The method of automatically successively planting and liquid spot mulching plant seeds in a plant row comprising the steps of:

(A) successively planting the plant seeds in plant cavities at accurately spaced intervals along the surface of a plant row, (B) caving soil adjacent to and around said cavities containing the planted seeds into said cavities to cover the same for germination and growth, (C) and successively and simultaneously synchronized with said planting operations applying spots of liquid mulch of limited longitudinal and lateral extent over the soil covering said planted seeds at longitudinally spaced intervals along said plant row.

2. A precision environment planting and mulching machine comprising in combination:

(A) an endless planter belt operating over a pair of horizontally spaced pulleys, (B) planting dibbles projecting outwardly from the outer face of said belt for forming planting cavities in the ground surface, placing seeds therein and covering said seeds with soil, (C) a planter frame journaled on and supporting said pulleys and belt in operative position, (D) a mulch dispensing device mounted on said frame to the rear of said endless belt, (E) a control device mounted on said frame actuated from undulating surfaces on the side of said belt to intermittently energize said mulch dispensing device for a limited time interval while said device is passing over a planted and covered cavity in said plant row including, (F) a normally open limit switch, (G) and raised dwell timing cam surfaces on the side edge of said belt arranged to intermittently actuate said limit switch so as to energize said control device in synchronized relationship with the planted seeds in said plant row as said frame travels therealong.

References Cited

UNITED STATES PATENTS

| | | | |
|---|---|---|---|
| 1,398,190 | 11/1921 | Howard | 111—3 |
| 2,625,122 | 1/1953 | Carelock | 111—3 |
| 3,094,809 | 6/1963 | Kaufman et al. | 47—9 |
| 3,154,031 | 10/1964 | Kappelmann | 111—7 |
| 3,175,523 | 3/1965 | Kappelmann | 111—89 |
| 3,221,681 | 12/1965 | Snyder et al. | 111—3 |
| 2,909,869 | 10/1959 | Dresser | 47—58 |
| 3,261,127 | 7/1966 | Ferm et al. | 47—58 |

ROBERT E. BAGWILL, *Primary Examiner.*